United States Patent [19]

Vetter

[11] Patent Number: 4,693,038
[45] Date of Patent: Sep. 15, 1987

[54] APPARATUS FOR OPTICALLY MONITORING THE SURFACE FINISH OF GROUND WORKPIECES

[75] Inventor: Ulrich Vetter, Stuttgart, Fed. Rep. of Germany

[73] Assignee: Schaudt Maschinenbau GmbH, Stuttgart, Fed. Rep. of Germany

[21] Appl. No.: 848,728

[22] Filed: Apr. 4, 1986

[30] Foreign Application Priority Data

Apr. 6, 1985 [DE] Fed. Rep. of Germany ....... 3512595

[51] Int. Cl.⁴ ............................................. B24B 49/12
[52] U.S. Cl. .................................. 51/165.72; 356/445
[58] Field of Search .......... 51/105 SP, 165.72, 165.91; 356/445; 33/178 E

[56] References Cited

U.S. PATENT DOCUMENTS

| 3,118,258 | 1/1964 | Price | 51/165.91 |
| 4,053,237 | 10/1977 | Casey | 356/445 |
| 4,283,146 | 8/1981 | Roussel | 356/445 |

FOREIGN PATENT DOCUMENTS

| 291553 | 8/1967 | Australia | 51/165.72 |
| 2523375 | 12/1976 | Fed. Rep. of Germany | 51/165.72 |
| 2820910 | 11/1978 | Fed. Rep. of Germany | 356/445 |
| 60-76647 | 5/1985 | Japan | 356/445 |
| 60-99563 | 6/1985 | Japan | 51/165.72 |

Primary Examiner—Harold D. Whitehead
Attorney, Agent, or Firm—Peter K. Kontler

[57] ABSTRACT

The surface of a rotating cylindrical workpiece is monitored by an optical testing unit while the workpiece rotates and is treated by the grinding wheel in a circular grinding machine. The optical testing unit is mounted in part on one sensor of a second testing unit which monitors the diameter of the surface of the workpiece. A transducer and a light source of the optical testing unit are remote from the one sensor and are connected by fiber optic conductors with a head which is recessed into the one sensor and focuses light upon the surface of the rotating workpiece and intercepts light which is reflected by the workpiece. Lubricant which coats the surface of the workpiece in the course of the grinding operation is blown away from such surface in the region where the light beam is focused upon the workpiece.

13 Claims, 5 Drawing Figures

APPARATUS FOR OPTICALLY MONITORING THE SURFACE FINISH OF GROUND WORKPIECES

CROSS-REFERENCE TO RELATED CASE

The diameter monitoring means in the apparatus of the present invention is similar to the monitoring means which is disclosed in the commonly owned copending patent application Ser. No. 690,128 filed Jan. 10, 1985, now U.S. Pat. No. 4,606,130 issued Aug. 19, 1986.

BACKGROUND OF THE INVENTION

The present invention relates to grinding machines and analogous machine tools in general, and more particularly to improvements in apparatus for monitoring the parameters of workpieces which are being treated by one or more grinding lapping, polishing or like wheels. Still more particularly, the invention relates to improvements in surface grinding machines or other types of machine tools which are used to treat rotary workpieces.

It is often desirable to ensure that the quality of finish of the surface of a ground, polished or similarly treated workpiece at least approximates a predetermined value. In accordance with heretofore known proposals, a workpiece which has been treated in a grinding machine (for example, in a circular grinding machine) is monitored in a laboratory subsequent to its removal from the grinding machine. The ground workpiece is cleaned to remove the film of lubricant which normally adheres to the freshly ground surface, and the surface of the thus cleaned workpiece is thereupon monitored in a suitable optical or other testing apparatus. For example, it is known to monitor the quality of finish of the surface of a ground workpiece by directing against the surface a beam of radiation which is reflected by the ground surface and is conveyed to an optoelectrical transducer. The transducer generates signals which are indicative of the quality of finish of the tested surface. Signals which are generated by the transducer are utilized to adjust the grinding machine so as to ensure that workpieces which are treated thereafter are finished to a higher degree of precision. In other words, the grinding machine is adjusted only upon completion of the treatment of that workpiece whose surface has been tested in order to ascertain the quality of its finish. Consequently, each workpiece which is found to be defective must be discarded. The adjustment of grinding machine in response to signals from the transducer can involve a dressing of the working surface of the grinding wheel.

OBJECTS AND SUMMARY OF THE INVENTION

An object of the invention is to provide a grinding machine or an analogous machine (hereinafter called grinding machine) wherein the quality of surface finish of the workpieces can be ascertained while the workpieces are still treated by the grinding wheel or grinding wheels.

Another object of the invention is to provide the grinding machine with a novel and improved apparatus which can simultaneously monitor several parameters of the workpiece while the workpiece is being treated by one or more grinding wheels.

A further object of the invention is to provide an apparatus which can be installed in existing grinding machines and occupies space which is readily available in such machines.

An additional object of the invention is to provide an apparatus which can simultaneously monitor at least two different parameters of a rotating workpiece.

Still another object of the invention is to provide a novel and improved method of monitoring the parameters of workpieces which are being treated by one or more grinding wheels in a grinding machine.

Still another object of the invention is to provide the apparatus with novel and improved means for supporting the means for monitoring the quality of surface finish of rotating workpieces in a circular grinding machine.

An additional object of the invention is to provide a grinding machine which embodies the above outlined apparatus.

Another object of the invention is to provide the grinding machine with novel and improved means for simultaneously monitoring the axial position, the diameter and the quality of surface finish of a rotating metallic workpiece.

An additional object of the invention is to provide a simple and reliable apparatus which can ascertain the quality of surface finish of a workpiece in a grinding machine at a time such that the quality of finish of the surface of the tested workpiece can be changed before the workpiece is removed from the grinding machine.

A further object of the invention is to provide a grinding machine which ensures that the number of rejects, due to the poor quality of surface finish of the workpieces, is reduced to a minimum or to zero.

The invention is embodied on an apparatus for ascertaining the parameters of a workpiece during treatment in a grinding machine. The improved apparatus comprises first monitoring means for ascertaining a first parameter of the workpiece and second monitoring means for ascertaining a second parameter, particularly the quality of surface finish, of the workpiece. A portion of one of the monitoring means is mounted on the other monitoring means.

The other monitoring means preferably includes a mobile workpiece-contacting member, and the aforementioned portion of the one monitoring means is mounted on such workpiece-contacting member. The workpiece-contacting member can constitute one of two sensors forming part of the other monitoring means.

The apparatus of the present invention is preferably designed to ascertain the parameters of a workpiece while the workpiece is actually contacted by the rotary grinding wheel of a grinding machine. The second monitoring means preferably comprises a radiation source (for example, a light source) which is remote from the workpiece-contacting member, a radiation focusing device (for example, a prism or the end portion of a bundle of fiber optic conductors) provided on the workpiece-contacting member and arranged to direct radiation upon the surface of the workpiece which is being contacted by the grinding wheel whereby at least some of the thus directed radiation is reflected by the surface of the workpiece, means for conveying radiation from the source to the focusing means, at least one transducer which is arranged to convert optical signals (for example, into electrical signals), and means for conveying reflected radiation to the transducer. The first monitoring means includes means for ascertaining the diameter of a round surface of the workpiece, and such ascertaining means can include the aforementioned workpiece-contacting member. The focusing means can be recessed into the workpiece-contacting member so that it is kept out of contact with but is closely adjacent to the surface of the workpiece which is contacted by the member. Such workpiece-contacting member can be provided with an opening and the aforementioned conveying means can comprise first fiber optic conductor means extending from the radiation source to the opening and second fiber optic conductor means extending from the opening to the transducer.

The focusing means can comprise a radiation deflecting element (such as a prism) having a radiation emitting first face and a second face which is inclined with reference to the first face. The first fiber optic conductor means can extend from the radiation source to the second face of the deflecting element, and the second fiber optic conductor means can extend from the second face of the deflecting element to the transducer. The second face of the deflecting element can extend substantially radially of the axis of the workpiece which is treated by the grinding wheel, and the first face of such deflecting element can extend substantially tangentially of the surface of the workpiece.

The apparatus preferably further comprises means for applying to the surface of the workpiece a coat of lubricating agent and means for removing the coat in the region where radiation impinges upon the surface of the workpiece so that radiation is reflected by an uncoated portion of the surface of the workpiece. The removing means can comprise a source of pressurized fluid (for example, a source of compressed air) and a nozzle which is connected to the fluid source and serves to direct at least one jet of pressurized fluid against the surface of the workpiece. The removing means can comprise a substantially annular nozzle which surrounds at least a portion of the focusing means, which is connected to the fluid source, and which serves to direct at least one jet of pressurized fluid against the surface of the workpiece. The workpiece is rotated in a predetermined direction, and the annular nozzle is preferably designed to have a substantially annular orifice which serves to direct the major part of the jet of pressurized fluid counter to the direction of rotation of the workpiece. The workpiece-contacting member can be provided with a substantially circular opening for the focusing means, and the orifice of the annular nozzle can be eccentric with reference to such opening.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4b is a sectional view as seen in the direction of arrows from the line B—B in FIG. 4a.

DESCRIPTION OF THE PREFERRED EMBODIMENTS

Figure 1:
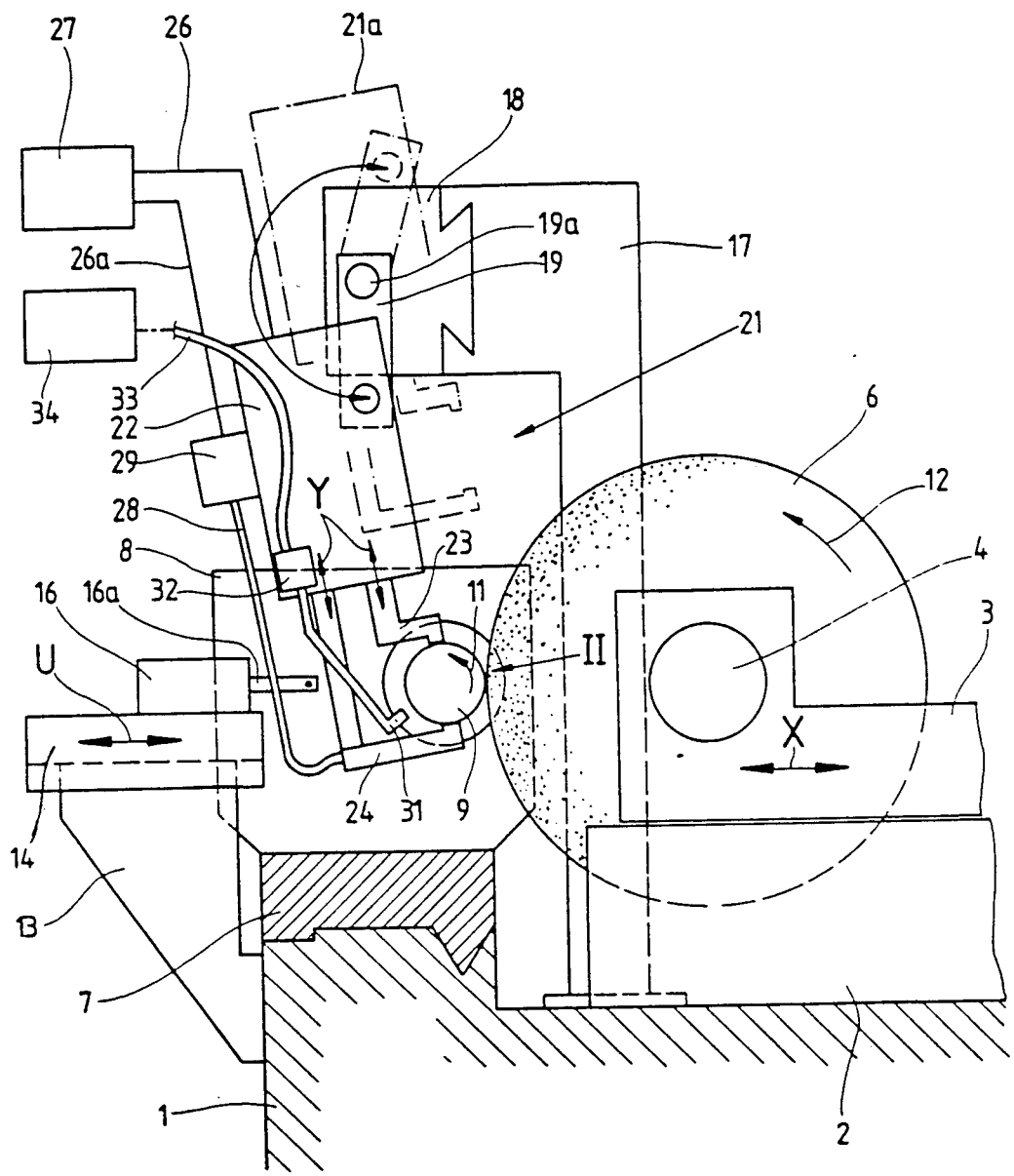
FIG. 1 is a partly elevational and partly vertical sectional view of a grinding machine which embodies the improved apparatus.

FIG. 1 shows a portion of a grinding machine wherein a bed 1 supports a block 2 defining a track for a horizontal carriage 3 which is reciprocable in directions indicated by an arrow X. The carriage 3 supports a horizontal spindle 4 which is driven by a motor (not shown) and carries a rotary grinding wheel 6 which is rotatable in the direction indicated by an arrow 12. When the grinding machine is in use, the grinding wheel 6 is rotated about the axis of the spindle 4 and the carriage 3 is fed in a direction to the left, as viewed in FIG. 1, so as to ensure that the working surface of the grinding wheel 6 can remove material from the peripheral surface of a horizontal rotary cylindrical workpiece 9 which is driven to rotate in direction indicated by an arrow 11.

The bed 1 further supports a table 7 which is reciprocable along a horizontal path at right angles to the plane of FIG. 1 and supports a headstock 8 as well as a tailstock (not shown). The end portions of the workpiece 9 are secured to the headstock 8 and to the tailstock, and such workpiece is driven by a motor, not shown, so that it is rotated in the direction which is indicated by the arrow 11. The table 7 can shift the workpiece 9 in the axial direction, namely in parallelism with the axis of the spindle 4.

The bed 1 further supports a bracket 13 which carries a slide 14 reciprocable in directions which are indicated by an arrow U, namely at right angles to the axis of the spindle 4 and to the direction of reciprocatory movement of the table 7 and workpiece 9. The slide 14 supports a monitoring unit 16 having a sensor 16a which can ascertain the axial position of the workpiece 9 while the latter is held between the headstock 8 and the tailstock 9. Signals which are generated by the sensor 16a and are transmitted to the circuit of the monitoring unit 16 are processed and transmitted to the control unit 27 of the grinding machine and can be used to shift the table 7 along its ways on the bed 1 if the axial position of the workpiece 9 is to be changed.

The bed 1 also supports an upright column 17 for a carriage 18 which is mounted at a level above the grinding wheel 6 and is reciprocable along the column 17 in parallelism with the track for the table 7, namely at right angles to the plane of FIG. 1. The carriage 18 supports the shaft 19a of a lever 19 which carries a monitoring unit 21 serving to ascertain the diameter of the workpiece 9 while the workpiece is being treated by the grinding wheel 6. The shaft 19a is connectable to a prime mover (not shown) in or on the carriage 18 so that it can pivot the monitoring unit 21 between the solid-line operative position and the phantom-line inoperative position 21a of FIG. 1.

The monitoring unit 21 comprises a housing 22 which supports two movable work-contacting members in the form of sensors 23, 24 which are reciprocable relative to the housing 22 in directions indicated by double-headed arrows Y. The sensor 23 can engage the periphery of the rotating workpiece 9 at a level above the axis of the workpiece, and the sensor 24 is designed to engage the workpiece 9 opposite the sensor 23, i.e., at a level below the axis of the rotating workpiece. The construction of the monitoring unit 21 is or can be identical with that of the monitoring unit which is disclosed in the aforementioned commonly owned copending patent application Ser. No. 690,128. Signals which are generated by the sensors 23, 24 while the workpiece 9 rotates in the direction of the arrow 11 and is treated by the grinding wheel 6 are transmitted to the circuit of the monitoring unit 21 in the housing 22, and the output of such circuit transmits signals to the control unit 27 of the grinding machine by way of conductor means 26. The control unit 27 can influence the rate of feed of the grinding wheel 6 toward the axis of the rotating workpiece 9, the rotational speed of the spindle 4, the rotational speed of the workpiece 9 and/or a dressing apparatus for the grinding wheel.

In accordance with a feature of the invention, the work-contacting member or sensor 24 of the monitoring unit 21 supports a portion of a further monitoring unit 29 which serves to ascertain the quality of surface finish of the rotating workpiece 9 while the workpiece is being treated by the grinding wheel 6. The monitoring unit 29 is an optical monitoring unit which includes a radiation source 39 (for example, a light source) shown in FIG. 3 and serving to emit radiation which is focused upon the peripheral surface of the rotating workpiece 9 by a focusing element in the form of a radiation deflecting prism 37 shown in FIG. 3. The prism 37 is installed in an opening 43 of the sensor 24, and more particularly at the free end of an elongated hollow arm 42 which is secured to or forms an integral part of the sensor 24. The radiation source 39 is remote from the workpiece 9 and from the grinding wheel 6, the same as an optoelectronic transducer 41 which serves to convert optical signals into electrical signals and to transmit the electrical signals to the control unit 27 by way of conductor means 26a.

The monitoring unit 29 further comprises a bundle 28 of fiber optic conductors. The conductors 28 include a first group or set 28a serving to convey radiation from the source 39 to the face 38 of the prism 37, and a second group or set 28b serving to convey radiation which is reflected by the surface of the workpiece 9 and passes through the prism 37 and on from the surface 38 to the transducer 41. The bundle 28 extends through the arm 42. That portion of the monitoring unit 29 which includes the source 39 and the transducer 41 is preferably mounted on the housing 22 of the monitoring unit 21.

The improved apparatus further comprises a nozzle 31 which has one or more orifices arranged to direct one or more jets of pressurized fluid (for example, compressed air) against the surface of the rotating workpiece 9 ahead of the locus where such surface is exposed to radiation issuing from the opening 43. This can be readily seen in FIG. 3 by considering the direction (arrow 11) of rotation of the workpiece 9. The nozzle 31 is connected to a source 34 of compressed air by a conduit 33. The conduit 33 (e.g., a flexible hose) is separably affixed to the housing 22 of the monitoring unit 21 by a fastening device 32. The exact nature of the source 34 forms no part of the invention; for example, such source can include a fan.

Figure 3:
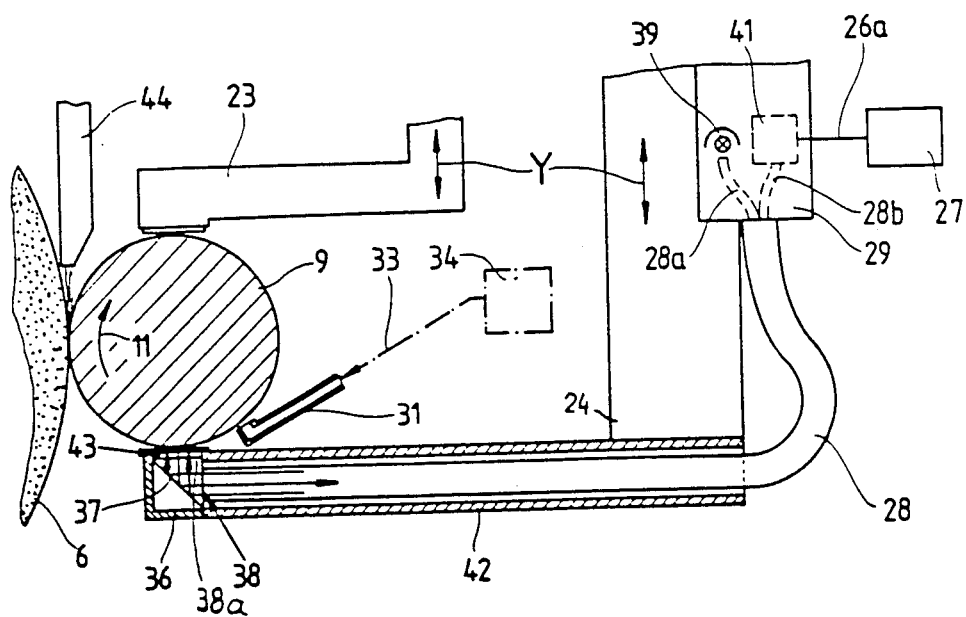
FIG. 3 is a sectional view as seen in the direction of arrows from the line III—III in FIG. 2.

As can be seen in FIG. 3, the hollow arm 42 carries a casing 36 which defines the opening 43 and receives the prism 37. The prism 37 has a face 38a which is disposed at right angles to the face 38 and is immediately adjacent to the opening 43 but is still out of contact with the surface of the rotating workpiece 9. Such positioning of the prism 37 in close or immediate proximity of the surface of the workpiece 9 ensures that a substantial percentage of reflected radiation reenters the prism 37 and can be directed into the fibers which form the portion 28b of the bundle 28. The distribution of fibers which form the portions 28a and 28b can be random or in accordance with a selected pattern. Such mode of distributing optic fiber conductors is known in the art and forms no part of the present invention. All that counts is to ensure that the monitoring unit 29 comprises suitable means for conveying radiation from the source 39 to the opening 43 of the casing 36 as well as to convey reflected radiation from the face 38 of the prism 37 to the inlet of the transducer 41. The manner in which the end portions of fibers constituting the bundle 28 are secured to the face 38 of the prism 37 so as to avoid excessive radiation losses is also known in the art. The transducer 41 can be any commercially available optoelectronic transducer which converts optical signals into electrical signals.

The hollow arm 42 constitutes a shield which protects the bundle 28 and the prism 37 against damage and/or contamination. That face (38a) of the prism 37 which is immediately adjacent to the opening 43 of the casing 36 is preferably arranged to direct radiation substantially radially of the rotating workpiece 9. The casing 36 is located in close or immediate proximity of the surface of but does not actually contact the workpiece 9. This is desirable and advantageous because the casing 36 is not subject to wear and the prism 37 is less likely to be contaminated.

It is well known that a workpiece which is treated by the grinding wheel in a surface grinding machine is normally coated with a layer of lubricant which further serves as a cooling medium. In the grinding machine of FIGS. 1 to 3, the surface of the rotating workpiece 9 is coated with a layer of suitable lubricating and cooling medium by a nozzle 44 (see FIG. 3) which discharges one or more streams of lubricant substantially tangentially of the workpiece 9 and grinding wheel 6. The lubricant coats the surface of the workpiece 9 but is removed in the region immediately upstream of the opening 43 in the casing 36 so as to ensure that radiation which issues from the prism 37 impinges upon an uncoated portion of the surface of the workpiece. The means for removing the layer of lubricant includes the aforementioned nozzle 31, conduit 33 and source 34 of compressed air or another suitable pressurized fluid medium. The orifice of the nozzle 31 is preferably directed substantially radially against the adjacent portion of the cylindrical surface of the workpiece 9 so as to ensure that lubricant is removed from that portion of the surface which is about to advance past the opening 43 of the casing 36. If desired, the film removing means can include two or more nozzles or a wide nozzle with numerous orifices which remove the layer of lubricant all the way between the axial ends of the rotating workpiece or between the axial ends of that portion of the workpiece which is to be treated by the grinding wheel 6.

Figure 2:
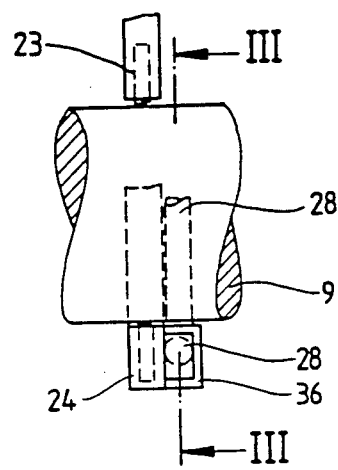
FIG. 2 is an enlarged view of a detail as seen in the direction of arrow II in FIG. 1.

The operation of the apparatus which is shown in FIGS. 1 to 3 is as follows:

When the machine is in use, the grinding wheel 6 is driven in the direction of arrow 12 and the workpiece 9 is driven in the direction of arrow 11. The nozzle 44 discharges a stream of lubricant some of which adheres to the surface of the rotating workpiece 9 and is removed by the nozzle 31 so as to ensure that radiation which is transmitted from the source 39 by portion 28a of the bundle 28 of fiber optic conductors is devoid of a film of lubricant. Radiation is reflected by the surface of the workpiece 9 and reenters the opening 43 to pass through the prism 37 and to issue at the face 38 so that it can be transmitted (via portion 28b of the bundle 28) into the inlet of the transducer 41 which generates appropriate electric signals and transmits the signals to the control unit 27 via conductor means 26a. The intensity of radiation which is transmitted to the transducer 41 is indicative of the quality of surface finish of the rotating workpiece 9. Signals which are transmitted to the control unit 27 can be used to change the rate at which the grinding wheel 6 is fed radially of the rotating workpiece 9, to change the rotational speed of the grinding wheel, to change the rotational speed of the workpiece 11 and/or to start or arrest a dressing apparatus for the grinding wheel.

Figure 4A:
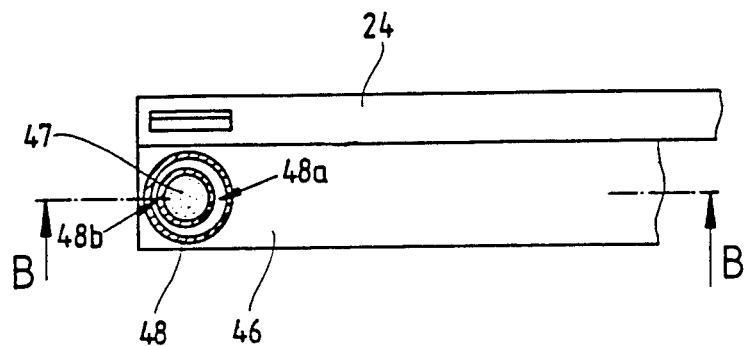
FIG. 4a is a fragmentary plan view of a portion of a modified apparatus.
Figure 4B:
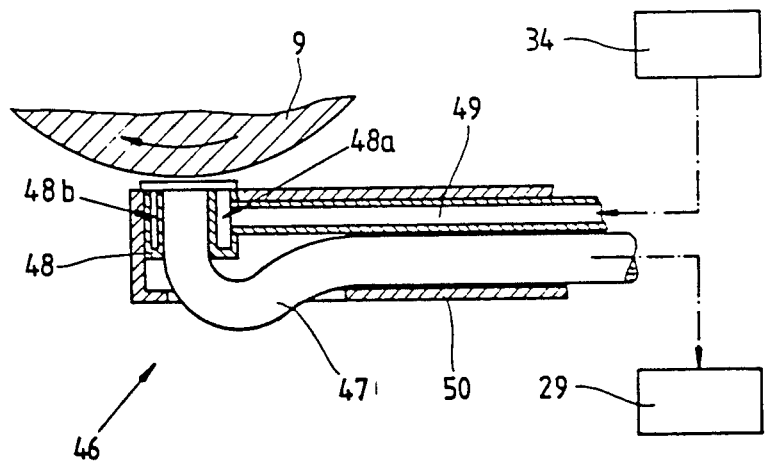

FIGS. 4a and 4b illustrate a portion of a modified apparatus. Only those parts of the modified apparatus are shown which are different from portions of the apparatus of FIGS. 1 to 3. The reference character 46 denotes that portion of the monitoring unit 29 which is mounted on a hollow arm 50 of the sensor 24. One of the primary differences between the apparatus of FIGS. 1 to 3 and FIGS. 4a, 4b is that the apparatus of FIGS. 4a and 4b does not employ a radiation deflecting prism. Instead, the ends of fiber optic conductors which form the bundle 47 are caused to extend all the way to the opening in the casing at the free end of the hollow arm 50 so that such ends are immediately or closely adjacent to the peripheral surface of the rotating workpiece 9. Those ends of the fibers of the bundle 47 which are immediately adjacent to the workpiece 9 are surrounded by an eccentric annular nozzle 48 having an annular orifice 48a, 48b which receives compressed air through a channel 49 in the arm 50. The channel 49 is connected to the outlet of the source 34 of pressurized fluid. The orientation of the orifice which is defined by the nozzle 48 is such that the major part of the stream or jet of compressed air issuing from a portion 48a of the orifice of the nozzle is directed counter to the direction of rotation of the workpiece 9, namely in a direction to the right, as viewed in FIG. 4b. The narrower portion 48b of the orifice discharges compressed air in such a way that the corresponding portion of the air stream flows in the direction of rotation of the workpiece 9. The orifice of the nozzle 48 terminates in immediate or close proximity of the surface of the workpiece 9. The same applies for the ends of fibers which constitute the bundle 47. This ensures that a substantial percentage of reflected radiation reenters the bundle 47 and can be conveyed to the transducer (not shown) of the monitoring unit 29. This monitoring unit further includes a radiation source which can be identical with the source 39 shown in FIG. 3. The hollow arm 50 shields the bundle 47 and the nozzle 48 against contamination and/or damage. The end portions of those fibers of the bundle 47 which convey radiation from the source to the surface of the workpiece 9 can be said to constitute an equivalent of the prism 37.

An important advantage of the improved apparatus is that the quality of surface finish of the rotating workpiece 9 can be ascertained while the workpiece is being treated by the grinding wheel 6. This renders it possible to adjust the operation of the grinding machine, and hence the treatment of the surface of the rotating workpiece 9, while the workpiece is being held between the headstock and the tailstock on the table 7. In other words, the machine can be adjusted to ensure adequate surface finish of the workpiece at the time while the workpiece 9 is being treated and while the diameter of the workpiece is being monitored by the unit 21 and the axial position of the workpiece is or can be monitored by the sensor 16a of the monitoring unit 16. The advantages of in-process monitoring of the finish of the surface of the workpiece will be readily appreciated by bearing in mind that, heretofore, such monitoring normally took place upon removal of the finished workpiece from the space between the headstock and the tailstock of the grinding machine. Consequently, if the surface finish of the monitored workpiece which is treated in a conventional machine is unsatisfactory, such workpiece must be discarded. On the other hand, the grinding machine which embodies the apparatus of the present invention can be adjusted during treatment of a workpiece so that the quality of surface finish can be improved before the workpiece is removed from the space between the headstock and the tailstock on the table 7.

The mounting of a portion of the monitoring unit 29 on the sensor 24 of the monitoring unit 21 ensures that the focusing means (the lens 37 or certain conductors at the free end of the bundle 47) is closely adjacent to the surface of the rotating workpiece and need not be specially adjusted in order to ensure that a substantial percentage of reflected radiation can reenter the bundle and can be conveyed to the transducer of the monitoring unit 29. The apparatus of FIGS. 1 to 3 exhibits the advantage that radiation is conveyed toward the workpiece 9 substantially tangentially of the surface of the workpiece and is thereupon deflected by the prism 37 so that it impinges upon the surface substantially radially of the rotating workpiece. The apparatus of FIGS. 4a and 4b exhibits the advantage that the prism 37 can be omitted, namely that radiation can be directed radially of the rotating workpiece 9 directly by the respective ends of some of fibers which constitute the bundle 47. Each of the two embodiments of the monitoring unit 29 is relatively simple, compact and can stand long periods of use.

The advantage of the nozzle 31 is that the film of lubricant which coats the major part of the surface of the rotating workpiece 9 cannot influence the quality of testing action which is performed by the monitoring unit 29, namely that the results of monitoring of surface finish of the workpiece are not distorted by a of lubricant. The provision of an annular nozzle 48 which surrounds the focusing means of the monitoring unit 29 contributes to compactness and simplicity of the improved apparatus. Moreover, such annular nozzle ensures predictable removal of lubricant from the region where the surface of the workpiece is being tested for the quality of its finish.

The focusing means of the monitoring unit 29 can be integrated into or separably connected to the sensor 24 of the monitoring unit 21.

A further important advantage of the improved apparatus is that the monitoring unit 29 occupies little room and need not be provided with separate means for moving its focusing means toward and away from the surface of the workpiece 9 which is held between the headstock and the tailstock on the table 7. In other words, the means for moving the sensor 24 can also move those portions of the unit 29 which must be shifted from time to time toward or away from the material removing station of the grinding machine as well as during actual treatment of the workpiece. The incorporation of a surface monitoring unit into a grinding machine entails a substantial reduction of the number of rejects because the quality of surface finish is monitored while the workpieces are being treated by one or more grinding wheels.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for ascertaining the parameters of a workpiece during treatment in a grinding machine while the workpiece is contacted by the rotary grinding tool of the grinding machine, comprising first monitoring means for ascertaining a first parameter of the workpiece; second monitoring means for ascertaining a second parameter including the quality of surface finish of the workpiece, at least a portion of one of said monitoring means being mounted on the other of said monitoring means, said second monitoring means comprising a radiation source, a radiation focusing device arranged to direct radiation upon the surface which is contacted by the grinding wheel whereby at least some of the thus directed radiation is reflected by the surface of the workpiece, means for conveying radiation from said source to said focusing means, at least one transducer arranged to convert optical signals, and means for conveying reflected radiation to said transducer; means for applying to the surface of the workpiece a coat of a lubricating agent; and means for removing such coat in the region where radiation impinges upon the surface of the workpiece so that radiation is reflected by an uncoated portion of the surface.

2. The apparatus of claim 1, wherein the other of said monitoring means includes a mobile workpiece-contacting member and said portion of said one monitoring means is mounted on said member.

3. The apparatus of claim 2, wherein said radiation source is remote from said member, and said radiation focusing device is provided on said member.

4. The apparatus of claim 3, wherein said first monitoring means includes means for ascertaining the diameter of a round surface of the workpiece.

5. The apparatus of claim 3, wherein said member includes a sensor and said focusing means is recessed into said sensor so that it is kept out of contact with but is closely adjacent the surface of the workpiece which is contacted by said sensor.

6. The apparatus of claim 5, wherein said sensor has an opening and said conveying means comprise first fiber optic conductor means extending from said source to said opening and second fiber optic conductor means extending from said opening to said transducer.

7. The apparatus of claim 2, wherein said focusing means comprises a radiation deflecting element having a radiation emitting first face and a second face inclined with reference to said first face, said conveying means comprising first fiber optic conductor means extending from said source to said second face and second fiber optic conductor means extending from said second face to said transducer.

8. The apparatus of claim 7 for ascertaining the parameters of rotary workpieces, wherein said second face extends substantially radially of the axis of the workpiece which is treated by the grinding wheel.

9. The apparatus of claim 1, wherein said removing means comprises a source of pressurized fluid and a nozzle connected to said fluid source and arranged to direct at least one jet of pressurized fluid against the surface of the workpiece.

10. The apparatus of claim 1, wherein said removing means comprises a source of pressurized fluid and a substantially annular nozzle surrounding at least a portion of said focusing means, connected to said fluid source and arranged to direct at least one jet of pressurized fluid against the surface of the workpiece.

11. The apparatus of claim 10 for ascertaining the parameters of a workpiece which is rotated in a predetermined direction, wherein said nozzle has a substantially annular orifice arranged to direct the major part of the jet of pressurized fluid counter to said direction.

12. The apparatus of claim 11, wherein said member has a substantially circular opening for said focusing means and said orifice is eccentric with reference to said opening.

13. The apparatus of claim 2, wherein said first monitoring means comprises means for ascertaining the diameter of a rotating cylindrical workpiece and said member includes a sensor which contacts the surface of the rotating workpiece during treatment of such surface by the grinding wheel of the grinding machine, said focusing means being mounted in said sensor.

* * * * *